…

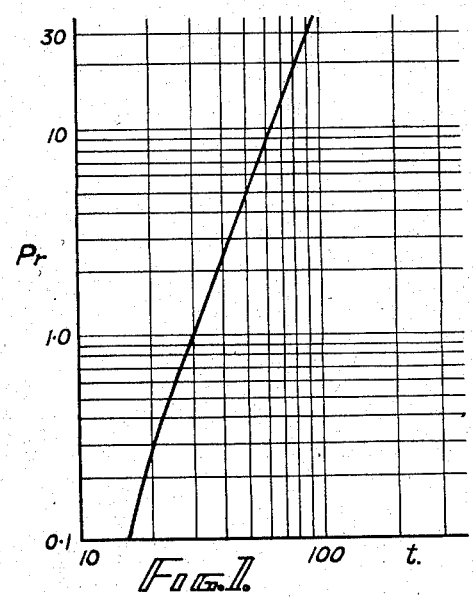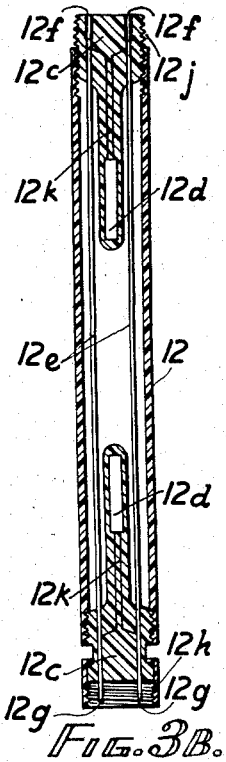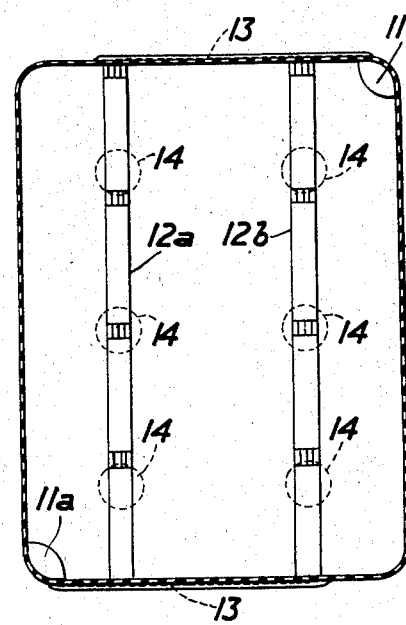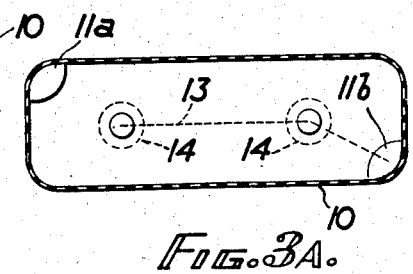

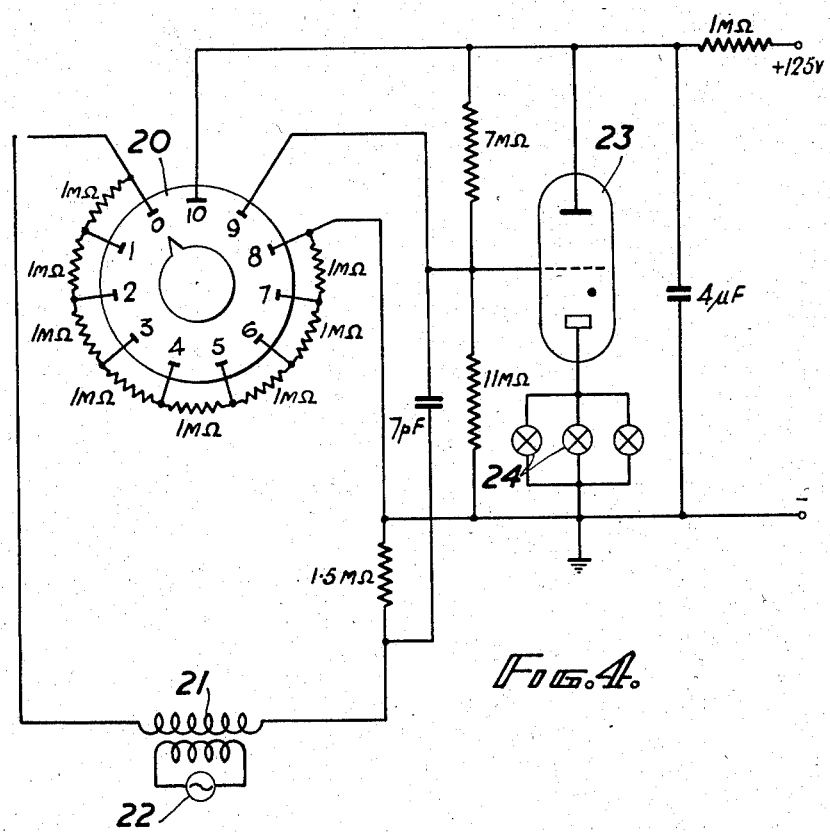
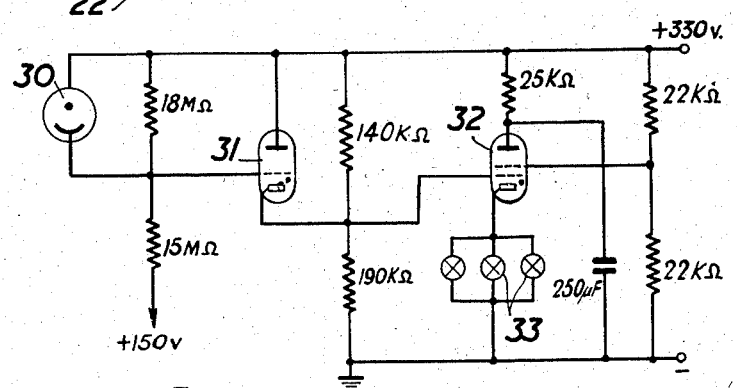

United States Patent Office 2,869,647
Patented Jan. 20, 1959

2,869,647

MEANS FOR DETECTING AND SUPPRESSING EXPLOSIONS

Anders Mathisen, London, England, assignor of one-half to Graviner Manufacturing Company Limited and one-half to The Wilkinson Sword Company Limited, both of London, England, companies of Great Britain Application April 6, 1954, Serial No. 421,302

Claims priority, application Great Britain April 9, 1953

5 Claims. (Cl. 169—4)

The present invention relates to improved apparatus for detecting and suppressing explosions.

In United States Patent No. 2,693,240, issued on November 2, 1954 to Graviner Manufacturing Company, Ltd. as assignee of the inventors there is described methods and apparatus for detecting incipient explosions in an explosive environment and subsequently suppressing the development thereof before it attains dangerous proportions. The method and apparatus described in the above patent specification was predicated upon the discovery that the pressure developed by certain types of explosions does not build up instantaneously from the moment of ignition but instead builds up comparatively slowly for a brief period following ignition. The patent specification makes known the further discovery that suitable steps can be taken during this "safe" period to detect such incipient explosion and to utilize the detected effect to suppress it before maturity.

The apparatus described in the above patent specification detects one of the effects of an embryonic explosion while conditions are still "safe" (i. e. the slowly rising pressure), and subsequently suppresses the embryonic explosion before the "safe" period has expired by the timely explosive dispersal of a suppressant material.

The present applicant has discovered that there is another effect which manifests itself during and immediately after ignition which can be used advantageously for detecting an incipient explosion during its "safe" period. This effect is the visible and invisible light rays which are emitted from the moment of ignition and which may be detected with suitable photo-electric equipment. Experimentation on the part of the present applicant has shown that the spectral distribution of the light radiation differs considerably with different explosive environments. Even when the same combustible materials are employed, the wave-length distribution of the light emission is a function of the relative proportions of the materials providing the environment. For example, a rich hydrocarbon fuel-air mixture may ignite with a predominantly red or infrared emission while a lean mixture may ignite with a characteristically blue or near-blue emission.

By utilizing in the manner to be described hereinafter certain known photo-electric devices, applicant has found it possible to detect the incipiency of an explosion by the light radiated from the origin thereof, and to utilize the electrical signal derived therefrom to subsequently detonate an explosively operated suppressing device to completely suppress the explosion, all within the "safe" period. Light detection as contrasted to pressure detection is of advantage under certain conditions, especially when extraneous pressure factors unrelated to an explosion are encountered.

It must be realized that photo-electric detection by itself is not the entire story. In addition, a fast-acting suppressing device, explosively operated as stated above, must be operatively connected to the photo-electric detector. The explosively operated hemispherical unit described in the aforementioned British patent specification is a typical example of the type of device required. It is this novel combination of a photo-electric detector and an explosively operated dispersal unit that forms a part of the present invention.

The invention further provides explosion suppression apparatus comprising photo-electric means adapted to respond to the illumination from an incipient explosion, or from the ignition source, and a frangible liquid suppressant container adapted to be shattered when a signal is produced by said detecting means as a result of an incipient explosion.

There is further provided in accordance with the invention explosion suppression apparatus, comprising a photo-multiplier adapted to produce a signal when exposed to the illumination from an incipient explosion, means for producing an amplified current from said signal, and a liquid suppressant distributor in which the liquid is supported by a frangible container, said distributor having explosive means adapted to be ignited by said amplified current for shattering said container and projecting the liquid at an initial velocity in excess of 150 feet per second.

The invention will be further explained with reference to several embodiments thereof, which are described by way of example only, reference being made to the accompanying drawings, in which:

Fig. 1 is a typical pressure-versus-time curve of the explosion of an ideal hydrocarbon-air mixture;

Fig. 2 is a plan view of an aircraft fuel tank with the top removed showing the location of the photo-electric detectors and suppressant distributors, whilst Fig. 3A is an end elevation of the tank shown in Fig. 2, with the end face removed;

Fig. 3B is a longitudinal section of one of the frangible tubes;

Fig. 4 is a circuit diagram of one typical detector circuit employing a photo-multiplier;

Fig. 5 is a detector circuit utilizing a simple photo-emissive cell in conjunction with cold-cathode electronic tubes, whilst

Figure 6:
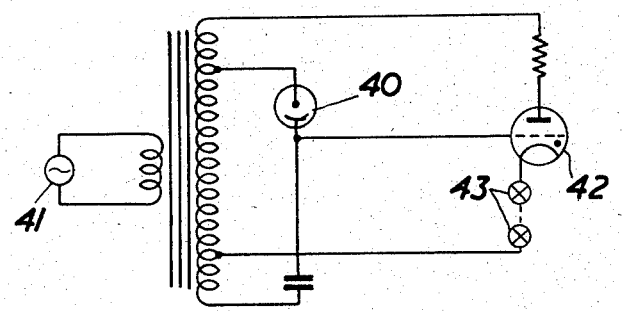
Fig. 6 is a further example of a circuit employing a simple emissive cell, in this case in conjunction with a thyratron tube.

The various embodiments of the invention will be described by way of example with reference to the suppression of explosions in aircraft fuel tanks. The conditions encountered in such applications vary over wide ranges and include hydrocarbon-air mixtures varying from very weak to highly over-rich and extreme conditions of temperature and humidity, and so forth. Thus an explosion suppression system which is satisfactory for aircraft installation will be readily capable of suppressing explosions in many other applications where the conditions imposed are less severe. It is to be understood, therefore, that the invention is not limited to aircraft applications but is applicable to many other explosive risks, e. g. diesel engine crankcases, catalytic chemical processes, electrostatic precipitators grinding and pulverising plants, and cyclones, filters, and generally speaking, any other plant where finely divided explosive dusts and powders are handled.

Referring now to Fig. 1 this shows a typical curve of the explosive rise in pressure in pounds per square inch (Pr) plotted against the time after ignition measured in milliseconds (t), the curve being of a test explosion in 45 gallon vessel with an ideal mixture of hydrocarbon and air. The pressure rise is typical of that which occurs upon the explosion of an ideal mixture of hydrocarbon fuel and air.

It will be seen that the time taken to reach an explosive rise in pressure of approximately 5 pounds per square inch is only about 50 milliseconds. It can be shown that the flame speed in the circumstances being considered is substantially independent of vapour volume and it follows, therefore, that the burning of a mixture in a small volume is completed more quickly than in a larger volume. Thus, for example, the time taken for an explosive rise of pressure of 5 pounds per square inch in a 5 gallon volume containing an ideal mixture, is only of the order of 23 milliseconds. Such volumes are quite likely to occur in practice in the case of nearly full fuel tanks, and it is clear, therefore that fast explosions in small volumes progress so rapidly that detection must take place in a minute fraction of a second if an incipient explosion is to be suppressed. The short time lag evident from the curve in Fig. 1 before the pressure commences to rise at an appreciable rate is probably due either to the time taken to build up the energy of the ignition source or the time required to ignite the combustible.

In order to detect such explosions with the extreme rapidity necessary in accordance with the present invention the detectors used comprise photo-electric cells which respond extremely rapidly to the illumination of the incipient explosion flame or even of the source of ignition itself, responding, for example, to illuminations of as little as 5 lux or less.

However, as stated above, fast detection alone is not sufficient and this must be combined with extremely rapid distribution of suppressant in liquid or vapour form. It has been found desirable under certain conditions to distribute the suppressant over a radius of 2 feet or more at a velocity of at least 150 feet per second, that is within about 10 milliseconds. Although these values may not be applicable to all types of explosions they are believed to be representative of the distributing velocity required.

For this reason ordinary fire extinguishers, and even those in normal use on aircraft for the rapid suppression of fires in engine bays, cannot be used. Instead the suppressant containers used must be of the kind in which at least a major part of the container which holds the liquid is shattered or opened when distribution is required, and which also include means for projecting the liquid or vapour droplets at the necessary velocity.

For this purpose, as previously mentioned, the form of hemispherical suppressant containers described in the aforesaid United States Patent No. 2,693,240 may be used, in which an explosive charge serves to shatter the hemispherical container and simultaneously project the liquid with the necessary velocity. However, other forms of suppressant container which will distribute the suppressant with comparable rapidity may be used. For example, suppressant containers of spherical and other shapes may be used provided that the major part of the liquid holding envelope is shattered or opened and that the necessary velocity is imparted to the contents.

Suitable materials for such containers are also described, for example, in British Patent Specification No. 702,919. Where the containers are of plastic material, it may be advantageous to use translucent material to facilitate checking of the contents.

Figs. 2 and 3 show sectional views through a typical aircraft fuel tank of the kind in which the liquid fuel is contained in a flexible rubber container 10. This rubber container 10 fits within a tank supporting structure (not shown) adjacent the skin of the fuselage or wing of the aircraft, which is usually stiffened at this point by stringers, the inner flange of the stiffeners supporting a thin skin which forms the tank supporting plating. Thus, the fuel is contained in the rubber container and the weight thereof is supported via the supporting structure by the wing or fuselage itself. Alternatively, instead of the rubber container, the thin skin referred to may form the tank, the metallic joints thereof being sealed in a suitable manner.

As shown in Fig. 2, one photo-electric detector 11a may be mounted in one upper corner of the tank whilst a similar detector 11b is mounted in the diametrically opposed lower corner of the tank. The use of two detectors mounted in this way ensures that when the orientation of the aircraft is such that one detector is covered by a substantial depth of fuel, which may appreciably attenuate the illumination falling on the cell, the other detector is not covered, or at the worst is covered only to an acceptable extent. The suppressant containers shown in Figs. 2 and 3 are in the form of two cylindrical tubes 12a, 12b, secured in each end of the tank 10 and extending throughout the length thereof.

Each tube 12a, 12b consists of four tubular suppressant containers joined end to end. As shown in detail in Fig. 3B each container comprises a tube 12 of frangible material, for example resin-bonded fibre, each end of which is closed by a plug 12c which serves to support a detonator 12d lying along the axis of the tube 12. The position of each detonator 12d is such that its explosive portion lies approximately midway between the inner end of its supporting plug 12c and the centre of the container.

Two wire conductors 12e serving as electrical bus bars extend throughout the length of the container, and at one end plug 12c the conductors 12e terminate in sockets 12f whilst at the other end plug 12c they terminate in projecting pins 12g. At this latter end, an internally-threaded captive connecting ring 12h is provided, the plug at the other end being provided with an external screw-thread 12j which is adapted to receive the connecting ring 12h of an associated container. In this way four suppressant containers can be connected together end-to-end by insertion of the pins 12g of one into the corresponding sockets 12f of the next container, the containers being thereafter secured together by screwing-up of the connecting rings 12h to give a long cylindrical tube as shown at 12a, or 12b in Fig. 2. The igniting wires 12k of the detonators 12d are connected to the respective bus bars 12c so that when an energising circuit is connected to one or both ends of the series of suppressant containers 12a, 12b all the igniting circuits are electrically in parallel. When the detonators 12d are ignited, substantially the whole of the container wall is shattered and the liquid is projected outwards in a cylindrical spray pattern co-axial with the axis of the container.

Wires 13 connect the conductors 12e to the detectors 11a, 11b and, conveniently, the connecting wires 13 are cast in the rubber walls of the tank. Tubular suppressors of the kind shown are particularly suitable for shallow tanks, for example the tank shown may be 4 feet long by 3 feet wide by 1 foot deep. If spherical suppressant containers of the kind already referred to are used these may be located, for example, as indicated by the broken lines 14, although hemispherical containers would be mounted with their back plate adjacent one wall.

Whilst the suppressant containers may contain a suppressant which acts partly by chemical action and partly by cooling action, such as methyl bromide or dibromo di-fluoro methane, it is also possible to suppress the explosion by using a liquid which acts to enrich the mixture beyond the explosive range. For this purpose a hydrocarbon liquid, for example iso-pentane, may be used. The great advantage of such an enriching liquid is that it has a much lower specific gravity than that of suppressants which act by cooling, the specific gravity of the latter being three to three and a half times greater. Moreover, enriching liquids do not give the corrosion and permeability problems in respect of the container which occur, for example, with methyl bromide. On the other hand, when using enriching type suppressants there is a danger of re-ignition from a lingering source of ignition, particularly if the aircraft were to make a rapid descent which caused air to be drawn in, thus bringing the mixture back to the explosive range.

The boiling point of the suppressant used is significant, as this will determine the variations of vapour pressure over the range of temperatures to be met with in the particular application. Thus, the suppressant must be sufficiently volatile to be effective at low temperatures whilst not having such a high vapour pressure at high temperatures as to require an unduly strong container. For aircraft use where the temperature may vary between —60° C. and +80 to 100° C., iso-pentane and di-bromo di-fluoro methane having a boiling point of about 26° C., at 14.7 pounds per square inch are the most suitable.

It will be understood that the size of the suppressant container determines the minimum spacing between containers which will give a required concentration of suppressant in terms of tank volume. The smaller the containers used the more even will be the distribution of suppressant, but this advantage will be at the expense of a more complex installation owing to the greater number of containers required.

The detector itself will next be considered in detail. As is well known to those versed in the art there are presently four basic types of photo-electric cells, viz. photo-emissive cells (both vacuum and gas filled), photo-voltaic cells or barrier cells, photo-conductive cells and photo-transistors or crystal-junction cells.

Under aircraft conditions it is necessary to allow for maximum temperatures of the order of 100° C. and the only known type of photo-cell which will work satisfactorily at such high temperatures is the photo-emissive cell, which is also the most sensitive cell for the visible part of the spectrum. Whilst it may be possible to insulate other types of photo-cells from the high temperatures, it is considered that this will generally be a complication to be avoided.

A particularly sensitive form of photo-emissive cell is one which incorporates an electron-multiplier, and which, for the sake of brevity, will be referred to hereafter as a photo-multiplier. For the kind of application discussed herein photo-multipliers may be of the order of 100 times more sensitive than a simple photo-cell and have a sensitivity greater than one microamp per lux, but on the other hand they suffer from the disadvantage of requiring a high potential power supply for the secondary anodes of the multiplier section. The voltage required is usually of the order of 70 to 100 volts per stage of multiplication, which in present day multipliers means a total of 700 or more volts.

No existing commercially available photo-cells have sufficient power output to ignite the explosive charges of the suppressant containers. In the case of photo-electric cells, including photo-multipliers, amplification of the output current is conveniently done electronically and this ensures almost instantaneous firing of the suppressors upon detection. The amplifier can consist merely of one or more cold-cathode valves which do not have fragile filaments and can be of robust construction.

Such an arrangement is shown in Figure 4 where the photo-multiplier 20 is represented by its end cap and pin connections, the pin 0 being the connection to the photo-cathode, pins 1—9 being connections to the multiplying dynodes and pin 10 being the connection to the collector anode. As shown, pin 0 is connected to one end of the secondary winding of a voltage step-up transformer 21 whose primary winding is connected to an A. C. supply 22. The latter can conveniently be a high-frequency high-voltage aircraft supply; thus the conventional 115 volt, 400 cycle aircraft supply may be transformed by the transformer 21 to a voltage of the order of 600 volts. The other end of the secondary winding is connected via a 1.5 megohm resistor to earth and to pin 8, and via a 7 pica-farad capacitor to pin 9. The collector anode is connected through pin 10 and a one megohm resistor to the positive terminal of a 125 volt D. C. supply, the negative terminal of which is earthed. The current amplifying valve is in the form of a cold-cathode triode 23 whose control grid is connected to pin 9. The cathode of the tube 23 is connected to earth through the igniting circuits of the explosive charges 24, the circuits being either in series or in parallel to one another. A 4 microfarad storage capacitor is connected across the 125 volt supply. A 7 and 11 megohm resistor form a potential divider across the 125 volt supply and apply a bias to the control grid of the tube 23 which is such that the tube is normally non-conductive. When illumination falls on the photo-cathode the enormously increased current between the last dynode and the collector anode virtually short-circuits the 7 megohm resistor and the increased voltage applied to the control electrode renders the tube 23 conductive, the subsequent discharge of the 4 microfarad condenser igniting the explosive charges. It may be mentioned that the object of the 1.5 megohm resistor and 7 pica-farad capacitor is to balance the unwanted internal capacitance of the photo-multiplier, which at the supply frequency concerned tends to reduce substantially the impedance across the upper arm of the potential divider.

One example of a commercially available photo-multiplier which may be used in the above circuit is a Mazda type 27M.2. This has a blue-sensitive photo-cathode, and even though higher sensitivity would be obtained over the majority of the explosive range encountered in incipient explosions if the cathode was red-sensitive, as will be further explained below, the multiplier is far more sensitive to incipient explosions in explosive mixtures throughout the whole range than a simple red-sensitive gas-filled cell. The cold-cathode tube may be a Ferranti type K41.

The danger of having a supply of the order of 1,000 volts in or near the fuel tank may be mitigated by having the transformer mounted in the immediate vicinity of the cell and insulating the transformer, multiplier pins and connections therebetween, by casting them in a plastic block, the light-sensitive portion of the cell projecting therefrom. This encasement in resin also serves to exclude fuel and water vapour.

Whilst cold-cathode tubes are preferred for amplifying the output current of the cell because of the absence of a heated filament and their greater robustness, it will be understood that thermionic amplifiers of conventional kind may be used. However, it should be clearly understood that such amplifiers cannot increase the effective sensitivity of the photocells, as for very small illuminations the output is comparable with the small random variations in cell output which are present even when the cell is in complete darkness. This random output places a lower limit on the illumination which can be detected with simple photo-cells. On the other hand, the use of electron multiplying stages as in the photo-multiplier gives amplification without increase in the dark current of the cell.

Where the very high sensitivity of a photo-multiplier is not required, a simple photo-emissive cell can be used. This photo-cell may be a vacuum cell, but is preferably gas-filled as such cells have a higher sensitivity than an equivalent vacuum cell. As shown in Fig. 5 the photo-electric cell 30 is connected across the upper arm of a potential divider formed by two resistors of 15 and 18 megohms respectively, and as with the previous circuit light falling upon the cell 30 causes a voltage rise at the control electrode of a cold-cathode triode 31 which is thereby rendered conductive. This triode 31 is in turn connected in parallel with the upper arm of a potential divider comprising resistors of 140 and 190 kilohms respectively, the junction of the resistors being connected to the control grid of a cold-cathode tetrode 32. This tetrode is connected in parallel with a storage capacitor of 250 microfarads, and the firing circuit for the explosive charges 33 of the suppressant distributors is connected in the cathode circuit of the valve. The value of the second potential divider is also chosen so that normally the tetrode 32 is non-conductive but the voltage rise occuring upon conduction of the triode 31 renders the tetrode 32 conductive and allows the 250 microfarad capacitor to discharge through the tetrode 32 and thereby ignite the explosive charges.

Typical tubes which may be used in this circuit are the Mullard 90 CG Photo-cell (Red-sensitive) and the Ferranti Cold-Cathode Triode K41 and tetrode NSP2.

Fig. 6 shows an alternative circuit working from an alternating current supply 41 without rectification, the photo-cell 40 being arranged, upon becoming conductive, to trigger a thyratron tube 42 and fire series-connected explosive charges 43. Thyratrons have the disadvantage of having a heated filament but are capable of passing a higher current than a cold-cathode valve of comparable size.

Figure 7:
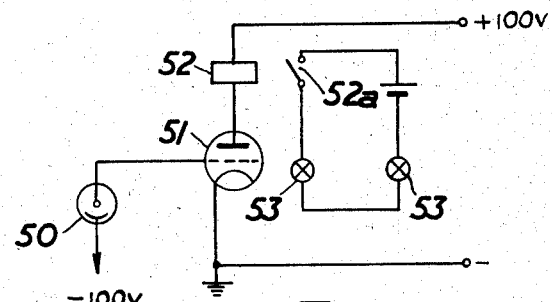
Fig. 7 is a further example of a circuit employing a photo-emissive cell, this time in conjunction with a thermionic tube and magnetic relay.

Fig. 7 shows a photo-cell circuit utilising a thermionic triode. The control grid of the triode 51 is connected to the anode of a photo-electric cell 50 whose cathode is connected to a negative bias source. When the photo-cell 50 is unilluminated the grid is virtually free so that the tube 51 passes a high anode current which energises an electro-magnetic relay 52. The relay 52 maintains a contact 52a, which is connected in the igniting circuit, in the open position. Illumination falling on the cell 50 will result in negative bias being applied to the grid of the tube 51 which will cut off its anode current, thereby de-energizing the relay 52 and closing the contact 52a in the igniting circuit of the explosive charges 53.

The effective amplification obtainable with this arrangement is very large and the device is comparable in sensitivity with the Fig. 4 arrangement. However, it suffers from the disadvantage of requiring a heated filament and also the grave disadvantage that any failure of the circuit would result in closure of the relay contacts and firing of the suppressant distributors, so that it is not suitable for use in aircraft. However, for other applications where these disadvantages are acceptable it is an attractive alternative to the use of a photo-multiplier.

Figure 8:
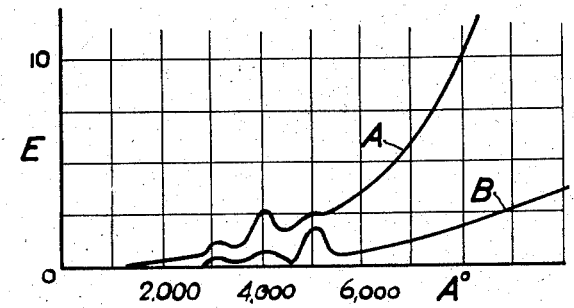
Fig. 8 is a curve showing, approximately only, the energy distribution over the visible spectrum for typical explosion flames.

The energy radiated from a hydrocarbon incipient explosion flame is not confined to any wave length or wave band nor is the energy content the same for each wave band. The spectral distribution of energy is an amalgamation of the separate characteristics of each component of the flame, these varying with the type of flame. The most important factor is the presence or otherwise of free carbon particles, which occur mainly in mixtures which are richer than ideal, and their presence greatly increases the radiation energy from the visible wave bands right into the infra-red. However, the types of photo-cells which have maximum sensitivity in the infra-red region are those which suffer seriously from reduced sensitivity at temperatures above 20° C., and for aircraft use it is necessary to use photo-cells having maximum sensitivity in the visible spectrum. At the weak end of the mixture range free carbon particles are not deposited and the incipient explosion flame spectrum is then due simply to the gases. This results in an enormous reduction in the total radiation energy relative to that occurring with rich mixtures as is shown in Fig. 8 which shows approximate energy distribution (E) over the visible spectrum in curve A for over-rich mixtures and curve B for weak mixtures. The general trend of the curve is due to black body radiation from the carbon particles, whilst the peaks at approximately 3000, 4000 and 5000 Angstrom units are due to radiation from the gases of combustion.

It will be clear from a consideration of Fig. 8 that whilst the colour of the flame is normally red for rich mixtures it becomes relatively less red as the mixture is made weaker, the increasing blueness of the flame being accompanied by a weakening of its luminous intensity.

Whilst photo-multipliers are sensitive enough to respond to the reduced luminosity at the weak end of the mixture range, if simple emissive cells are used it may be desirable to use two parallel connected cells in, for example, the circuits shown in Figs. 5 to 7, one cell being blue-sensitive whilst the other is red-sensitive. Thus, a combination of Mullard type 90CG and 90AG photo-cells may be used. The use of two or more parallel cells will, of course, improve the sensitivity of the device over most of the mixture range, and more than one cell of a given sensitivity may be used. It should also be mentioned that it is possible to obtain an appreciable increase in the radiation from a vapour flame by adding minute quantities of certain substances to the fuel in the tank. Such substances must vaporise with the fuel and still be retained in storage, and must not cause damage to the engine or fuel system. One example of such substances is iron pentacarbonyl.

As is well known, visible light illumination follows an inverse square law so that illumination decreases as the square of the distance. However, in a tank with whitened walls the reflection of radiation from the interior of the tank increases the sensitivity of detection and, furthermore, the inverse square law no longer holds true. It is therefore possible to obtain an improvement of the order of factor 4 by whitening the walls of the tank. A bright metal interior gives a somewhat smaller improvement. Furthermore, light guides or optical amplifying means may be used to increase the illumination falling on the photo-cell.

Photo-voltaic or barrier cells are not suitable for aircraft use owing to loss of sensitivity at the relatively high temperatures to which the cell may be exposed, in addition to which difficulties are experienced in amplifying the photo-cell output because of the low load-resistance which must be used. This type of cell has the advantage that it is self-generating and does not require an external power supply. A typical output current into 1,000 ohms is about 4 microamps, and this is sufficient to give direct operation of a high speed relay, for example a polarised relay of the Carpenter type. However, the current is not sufficient for safe operation of a relay if subject to vibration, and it is desirable to consider means of increasing the current output. One method is to provide a mosaic of cells connected in series. A magnetic amplifier is more suitable than a thermionic tube amplifier, but such amplifiers are subject to response lags of the order of a few milliseconds, according to the A. C. supply frequency and power amplification required. However, where such response delays are acceptable and where the maximum temperature is not such as to reduce the cell sensitivity excessively, the use of barrier cells is quite practical.

Figure 9:
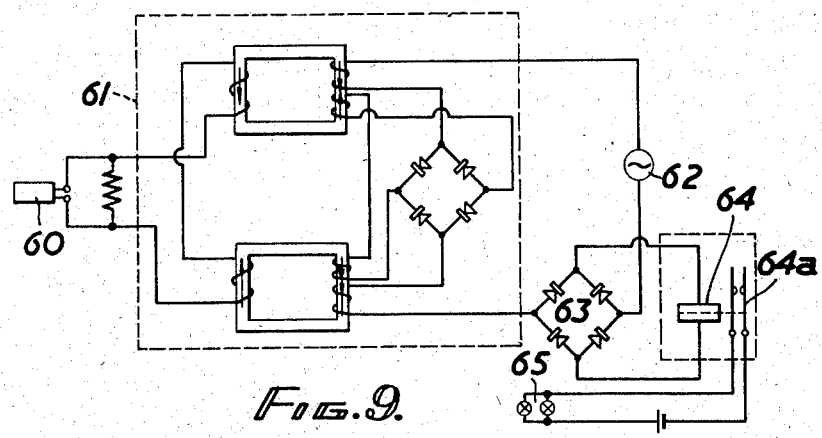
Fig. 9 is a circuit diagram of a detector circuit comprising a barrier layer cell and magnetic amplifier, whilst

Fig. 9 shows a circuit arrangement in which a barrier cell 60 of the selenium type is connected to the input of a magnetic amplifier 61 of conventional form which is energised from a 400 cycle A. C. supply 62. The output from the amplifier is rectified by a bridge rectifier 63 and is fed to a high speed relay 64 which closes contacts in the igniting circuit for the explosive charge 65.

Figure 10:
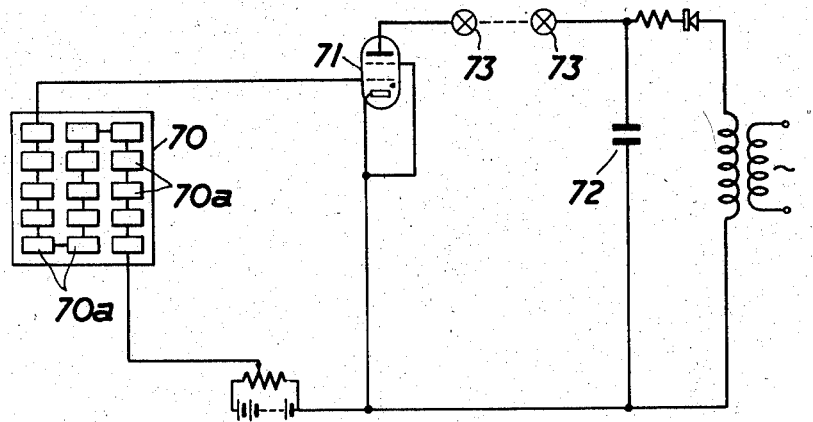
Fig. 10 is a detector circuit comprising a mosaic type of barrier cell.

In the arrangement shown in Fig. 10 the cell 70 is of a kind utilising a mosaic of barrier layer cells 70a, and in this case the cell output is used to trigger a cold-cathode tube 71 which discharges a storage capacitor 72 through the igniting circuit 73. It will be understood that individual cells 70a in the mosaic may have different spectral response for the reason already discussed.

Figure 11:
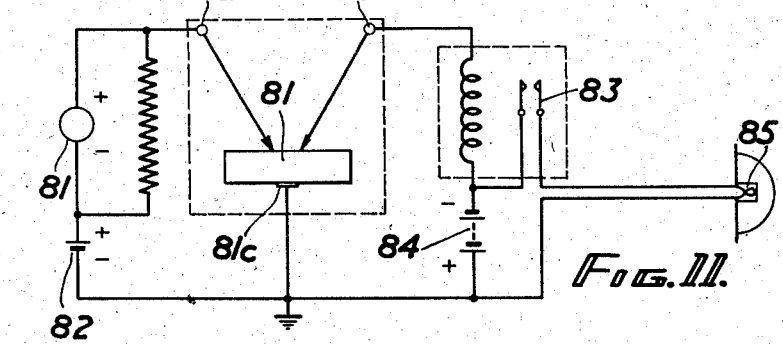
Fig. 11 is a circuit similar to Fig. 9 but using a transistor amplifier.

A further possibility is to use amplifiers of the transistor type to amplify the output of a barrier layer cell, and such an arrangement is shown in Fig. 11, where the cell 80 is connected between the emitter electrode 81a of the transistor 81 and its bias source 82. The collector electrode is connected through the coil of a high speed relay 83 to the negative terminal of a suitable bias source 84, the positive terminal of the latter being connected to earth and to the base 81c of the transistor. As before, energisation of the relay 83 completes the igniting circuit 85.

Apart from their use as amplifiers transistors of suitable form may also be used as the actual detector element, as it has been found that certain forms of transistors possess photo-electric properties. One or more such transistors having such properties may thus be used in conjunction with amplifying transistors or other amplifying means. It will be appreciated that a very compact detector can be obtained by using such transistors in association with a miniature high-speed electro-magnetic relay arranged to complete the igniting circuit.

Photo-transistors are not yet commercially available and their sensitivity and stability are not comparable to that of photo-emissive cells, particularly photo-multipliers, at the present time.

The last type of photo-cell to be considered is the photo-conductive type whose maximum sensitivity lies well into the infra-red portion of the spectrum where, as stated above, the major part of the radiation from an incipient explosion flame lies. For aircraft use this type of cell is unsuitable due to temperature limitations. Furthermore, an A. C. amplifier must be used to amplify the output, but as the latter is in the form of a D. C. signal it is necessary to arrange for "chopping" or periodic interruption of the radiation falling on the cell to give a pulsating output from the cell which can be amplified. The flicker in incipient explosion flames is not sufficient to eliminate the necessity for such periodic interruption.

For applications where these disadvantages are acceptable, and particularly where the radiation is mainly infra-red, photo-conductive cells are quite suitable.

Whilst many of the conditions referred to above have been those which occur in the case of incipient explosions in aircraft fuel tanks, it will be understood that suppression systems for other explosive risks, for example those occurring with dusts or powders, can be engineered on similar lines. The choice of detector must be determined after consideration of the various conditions existing, such as maximum ambient temperature and spectral distribution of the illumination resulting from an incipient explosion in the explosive atmosphere concerned. Similarly, choice of suppressant, the concentration required and the required speed of distribution will depend upon the conditions associated with the particular risk.

Reference has already been made to one form of detector using a photo-multiplier in which all the high-voltage components including a transformer are encased in a block of insulating material. An even more compact form of detector can be produced by utilising a voltaic pile as the power supply for the detector. Whilst the power available from such a pile is very limited, it will, nevertheless, be sufficient to provide a high-voltage supply for a photo-multiplier or photo-conductive or photo-emissive cell, as well as for an associated cold cathode tube. In order to limit the size of pile the photo-electric cell should have as small a dark current as possible. The size of the pile can also be reduced by connecting in parallel a storage capacitor which is charged from the pile. This capacitor should preferably have a very high leakage resistance to limit discharge of the pile.

By utilising the stored charge for igniting the explosive charge the detector and power supply may be formed as a completely self-contained unit which is wired to the explosive charge but requires no connection to external power supplies, thus avoiding the necessity for bringing electrical connections through the tank walls.

What I claim is:

1. Explosion suppression apparatus, comprising a photo-multiplier adapted to produce an electric signal when exposed to the illumination from an incipient explosion, amplifying means connected to said photo-multiplier for producing an amplified current from said signal, and a liquid suppressant distributor having a frangible liquid containing portion, said distributor having electrically ignitable explosive means electrically connected to said amplifying means and adapted to be ignited by said amplified current for shattering said container and projecting the liquid at an initial velocity in excess of 150 feet per second.

2. Explosion suppression apparatus, comprising at least one electrically ignitable explosion charge, a photo-multiplier having a sensitivity greater than one microamp per lux, said photo-multiplier having a pair of electrical output terminals, a cold cathode tube, said tube having a cathode, an anode and at least one control electrode, an electrical power supply, a potential divider connected across said supply, a tapping point on said potential divider being connected to said control electrode normally to bias said tube to a non-conductive state, a storage capacitor connected across said supply, said explosive charge having an ignition circuit connected in circuit with said cold cathode tube across said supply, and electrical connections between the pair of output terminals of said photo-multiplier and the anode and control electrode of said cold cathode tube respectively.

3. An explosion suppression device including a liquid suppressant distributor having electrical operating means connected thereto, comprising a photo-multiplier having a sensitivity greater than one micro-amp per lux, said photo-multiplier having a pair of electrical output terminals, an electronic tube, said tube having a cathode, an anode and at least one control electrode, an electrical power supply, a potential divider connected across said supply, a tapping point on said potential divider being connected to said control electrode normally to bias said tube to a non-conductive state, a storage capacitor connected across said supply, current flow responsive means connected in circuit with said tube across said supply, and electrical connections between the pair of output terminals of said photo-multiplier and the anode and control electrode of said tube respectively.

4. An explosion suppression device including a liquid suppressant distributor having electrical operating means connected thereto comprising a photo-sensitive device, a resistor, an electrical power supply, said photo-sensitive device and said resistor being connected in series across said power supply, an electronic tube, said tube having a cathode, an anode and at least one control electrode, said control electrode being coupled electrically to the junction of the series connected resistor and photo-sensitive device, means for biassing said tube to render it normally non-conductive, and current flow responsive means connected in circuit with said tube whereby current flows through said current flow responsive means when said tube is rendered conductive.

5. An explosion suppression device including a liquid suppressant distributor having electrical operating means connected thereto comprising a photo-sensitive cell, a resistor, an electronic tube, said tube having a cathode, an anode and at least one control electrode, an electrical power supply, said cell and said resistor being connected in series across said power supply whereby the potential of the junction point between said cell and said resistor is dependent upon the amount of light falling upon said cell, said junction point being electrically coupled to said control electrode, means for biassing said control electrode to render said tube non-conductive until the potential at said junction point rises by a predetermined amount as a result of light falling upon said cell, a storage capacitor connected in parallel with said tube and current utilisation means connected in the cathode circuit of said tube.

References Cited in the file of this patent

UNITED STATES PATENTS

| | | |
|---|---|---|
| 1,958,893 | Kintner et al. | May 15, 1934 |
| 2,570,280 | Roffman | Oct. 9, 1951 |
| 2,693,240 | Glendinning et al. | Nov. 2, 1954 |